Jan. 15, 1946. T. E. GRACE 2,393,158
PROPELLER MOUNTING
Filed Jan. 8, 1942 2 Sheets-Sheet 2
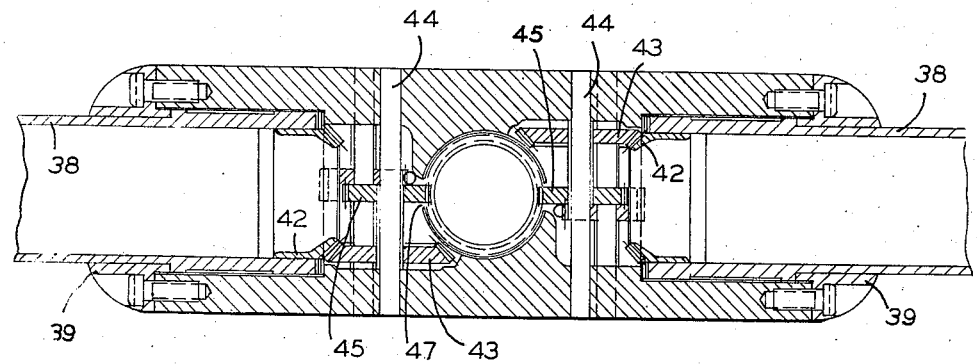
FIG. 4
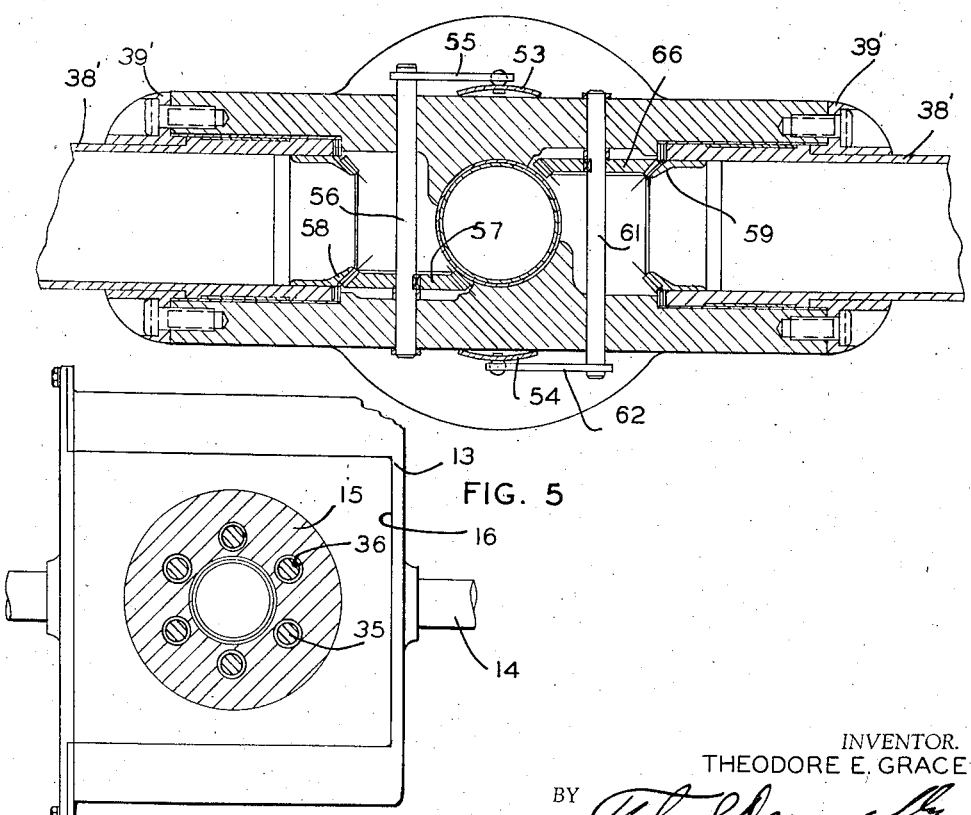
FIG. 5
FIG. 6
INVENTOR.
THEODORE E. GRACE
BY
ATTORNEY.

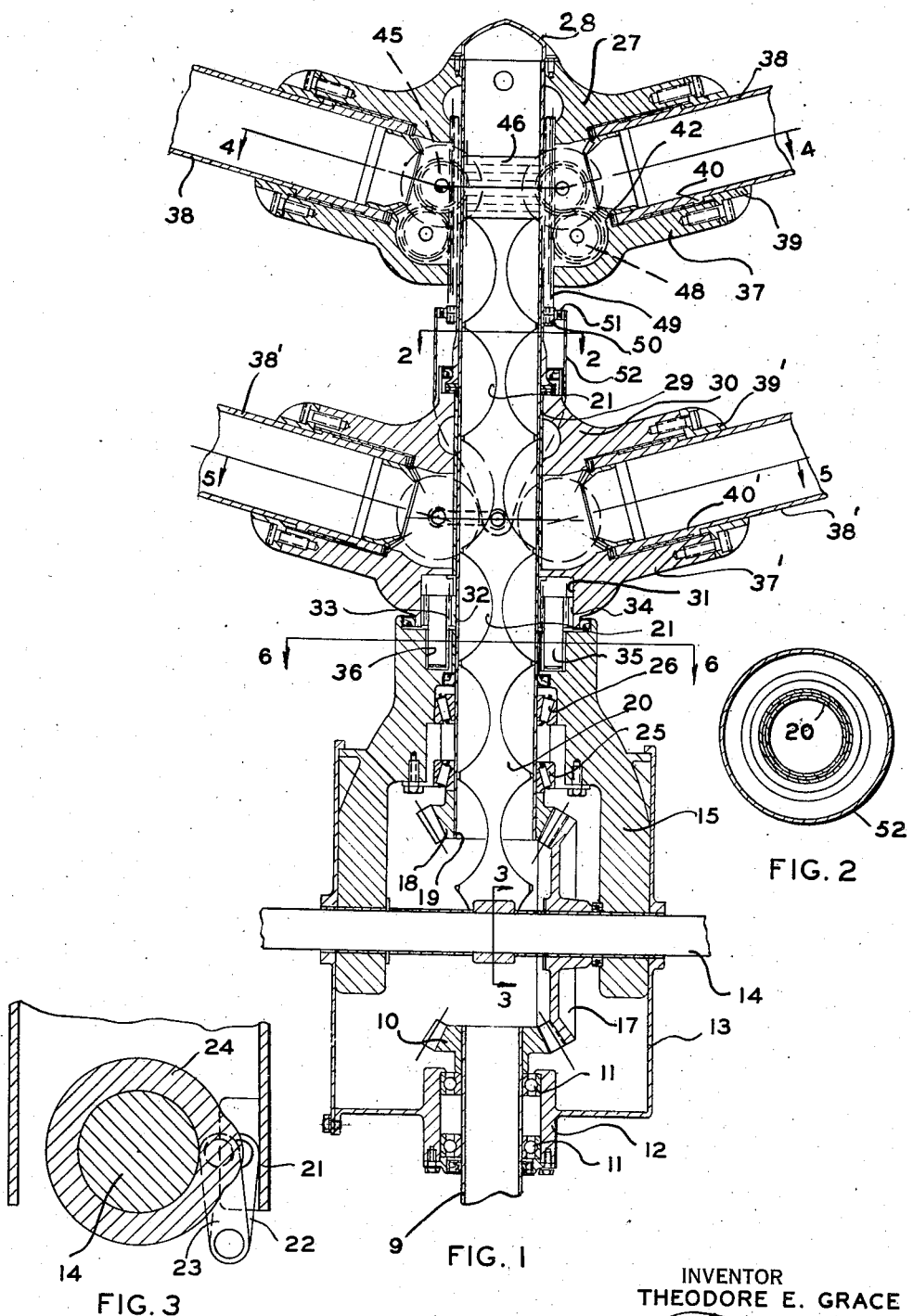

Patented Jan. 15, 1946

2,393,158

UNITED STATES PATENT OFFICE 2,393,158

PROPELLER MOUNTING

Theodore E. Grace, Detroit, Mich.

Application January 8, 1942, Serial No. 426,015

2 Claims. (Cl. 170—135.6)

My invention relates to a new and useful improvement in a propeller mounting adapted for use particularly on aeroplanes which utilize a propeller rotating at high speed.

It is an object of the present invention to provide a propeller mounting so arranged and constructed that the vibration resulting therefrom will be reduced to a minimum.

Another object of the invention is the provision of a propeller mounting so arranged and constructed that the unbalanced forces incident to the rotation of the propeller will be reduced to a minimum with a consequent reduction of vibration resulting therefrom.

Another object of the invention is the provision of a propeller mounting so arranged and constructed that a multiple number of propellers may be rotated in opposite directions from a common drive shaft.

Another object of the invention is the provision of a propeller mounting so arranged and constructed that the propeller blades may be rocked on their axis for varying the pitch thereof and consequently, adjusting the propelling forces.

Another object of the invention is the provision of a propeller mounting so arranged and constructed that the propellers may be swung through an arc of substantially 90 degrees for driving the aeroplane in horizontal direction or driving it in a vertical direction so that the propellers may be used merely for propulsion or also may be used for lifting.

Another object of the invention is the provision of a propeller mounting which will afford a means for driving the one propeller in one direction and another in another direction, while employing a minimum number of parts and maintaining the structure light, compact, durable and highly efficient in use.

Other objects will appear hereinafter.

It is recognized that various changes and modifications may be made in the detail and structure and it is intended that such variations and departures shall be embraced within the scope of the claims attached hereto.

Forming a part of this specification are drawings in which:

Fig. 1 is a longitudinal, central, sectional view of the invention.

Fig. 2 is a sectional view taken on line 2—2 of Fig. 1.

Fig. 3 is an enlarged sectional view taken on line 3—3 of Fig. 1.

Fig. 4 is an enlarged sectional view taken on line 4—4 of Fig. 1.

Fig. 5 is an enlarged sectional view taken on line 5—5 of Fig. 1.

Fig. 6 is a sectional view taken on line 6—6 of Fig. 1.

In the drawings I have illustrated a driving shaft 9 which is formed tubular and on which is fixedly mounted a bevel gear 10. The shaft 9 is journalled in suitable bearings 11 contained in the hub 12 which forms a part of the housing 13, this housing 13 being suitably mounted in stationary position.

Extended through the housing 13 is a shaft 14 which may be rocked on its axis and which also serves as a pivot for a supporting hub 15 which the shaft 14 is projected through. As shown in Fig. 6 the housing 13 is provided with the open space 16 through which the hub 15 may be swung. Suitable mechanism for swinging the hub 15 to its various positions may be utilized but this mechanism, of itself, forms no part of the present invention and is not shown.

Rotatably mounted on the shaft 14 is a bevel gear 17 meshing with the gear 10 and thus rotated by the driving shaft or tube 9. This gear 17 meshes with the bevel gear 18 which is fixedly mounted on the lower end of a tube 19 which embraces the telescoping tube 20, this tube being cut away as at 21 for the purposes of lightening the same. The tube 20 is connected by the links 22 and 23 to the collar 24 which is fixedly mounted on the shaft 14, the construction being such that as the shaft 14 is rocked the tube 21 will be moved vertically upwardly or downwardly in Fig. 1, the purpose of which will appear as the description proceeds.

The tube 19 is journalled in bearings 25 and 26 which are mounted on the hub 15. This tube 19 extends into the blade hub 27 which is provided with a cap 28 serving as a closure for the open end of the tube 19. The construction is such that when the shaft 9 is rotated the tube 19 is rotated in one direction through the gears 10, 17 and 18.

The tube 19 projects through a bushing 29 carried by the blade hub 30. This hub 30 is driven by the tube 19 in a direction opposite to the direction of rotation of the tube 19. Formed in the lower end of the hub 30 is a recess or cavity 31. The periphery of the tube 19 carries teeth 32 which mesh with the teeth of a pinion 33, the teeth of which pinions mesh with teeth 34 formed on the inner face of the recess 31. Pins 35 project through the pinions 33 and ride in a groove 36 formed in the hub 15. Thus the pinion gear serves as an idler gear for driving the hub 30.

Projecting outwardly from the hub 27 are socket-bearing arms 37 in which the hub 38 of a propeller blade may engage, this hub being secured in position by the securing cap 39 which serves to engage the peripheral flange 40 formed on the hub 38. The hub 30 is also provided with the socket-bearing arms 37' for reception of the propeller hub 38' held in position by the cap 39' which engages the peripheral flange 40'. In this way the propeller hubs are mounted in the socket-bearing arms 37 and 37' so as to be rotatable therein.

A means for rotating the propeller hubs 38 and 38' is provided so that the pitch of the propeller blades may be varied as desired.

Mounted fixedly on the inner end of the hub 38 is a bevel gear 42 which meshes with a bevel gear 43 fixedly mounted on the shaft 44. Fixedly mounted on the shaft 44 is a pinion 45 which is adapted to mesh with the circular rack teeth 46 formed on the periphery of the upper end of the tube 20, the tube 19 having a slot 47 formed therein, as clearly appears in Fig. 4, through which the pinion 45 may project. Consequently, by reciprocating the tube 20 relatively to the tube 19 the pinions 45 would be rotated to effect a rocking of the propeller hubs 38 on their axes and, thus varying the pitch of the propeller blades.

The pinion 45 meshes with a pinion 48 which is in engagement with the rack bar 49 carried by and projecting upwardly from the ring 50 which embraces and rotates in unison with the tube 19. Rotatably carried by the ring 50 on the bearings 51 is a tube 52 having its opposite sides cut away to provide the depending tongues 53 and 54. The tongue 53 is connected by the lever 55 to a shaft 56 on which is fixedly mounted a bevel gear 57 meshing with a bevel gear 58. Fixedly mounted on the end of one of the propeller hubs 38' on the end of the other propeller hub 38' is a bevel gear 59 meshing with the bevel gear 60 fixedly mounted on the shaft 61 which is rocked by the lever 62 connected to the arm 54. The construction is such that as the tube 20 is reciprocated in one direction in the tube 19 the propeller hub 38 will be rocked on their axes at the same time through the operation of the gears 48, rack bar 49 and the tube 52 with its connected levers 55 and 62, the propeller hubs 38' will be rocked on their axes in a direction opposite to the direction of the rocking of the hubs 38.

The shaft 14 may, of course, be rocked by any suitable lever or mechanism to any desired distance to determine the amount of travel of the tube 20 in the tube 19. In this way there is provided a simple and easily operated mechanism for adjusting the teeth of the propeller blades and simultaneously adjusting the pitch of a pair of propellers which are rotating in opposite directions.

In this way I have provided a propeller mounting so arranged and constructed that a smooth operation of an aeroplane becomes possible, reducing the vibration and the consequent wear on the body, fuselage and wings of the aeroplane to a minimum because of dampening out the unbalanced forces to the mechanism whereby the propellers are rotated in opposite directions. I have also provided a simple and easily operated mechanism whereby the pitch of the blades may be varied with the consequent advantages incident thereto.

What I claim as new is:

1. In a propeller mounting of the class described, a rotatable shaft; a beveled gear rotatably mounted on said shaft; a tubular driving shaft; a gear fixedly mounted on said driving shaft and meshing with said beveled gear for driving the same; a tube; a gear fixedly mounted on said tube and meshing with said beveled gear; a telescoping tube in telescopic relation with said first-named tube; links carried by said telescoping tube; and a collar fixedly mounted on said first-named rotatable shaft and connected to said links for, upon rotation of said first-named shaft, effecting a longitudinal movement of said telescoping tube.

2. In a propeller mechanism of the class described, a tubular shaft; a propeller hub mounted on and rotatable in unison with said tubular shaft; propeller blades on said propeller hub rotated in unison therewith and rockable on their longitudinal axes; a second-named tubular shaft in telescopic arrangement with said first-named tubular shaft; means for rotating said first-named tubular shaft in one direction; means, operable upon the rotation of said first-named shaft in said direction, for rotating said second-named shaft in the opposite direction; a propeller hub on said second-named shaft and rotatable in unison therewith; propeller blades on said second-named hub rotatable in unison therewith and rockable upon their longitudinal axes; a third shaft; a collar on said third shaft; means movable longitudinally of said tubular shafts for simultaneously rocking the blades in one hub in one direction and the blades in the other hub in the other direction for varying the position of said blades; and links connecting said longitudinally movable means to said collar for effecting longitudinal movement of said longitudinally movable means.

THEODORE E. GRACE.